Patented May 27, 1941

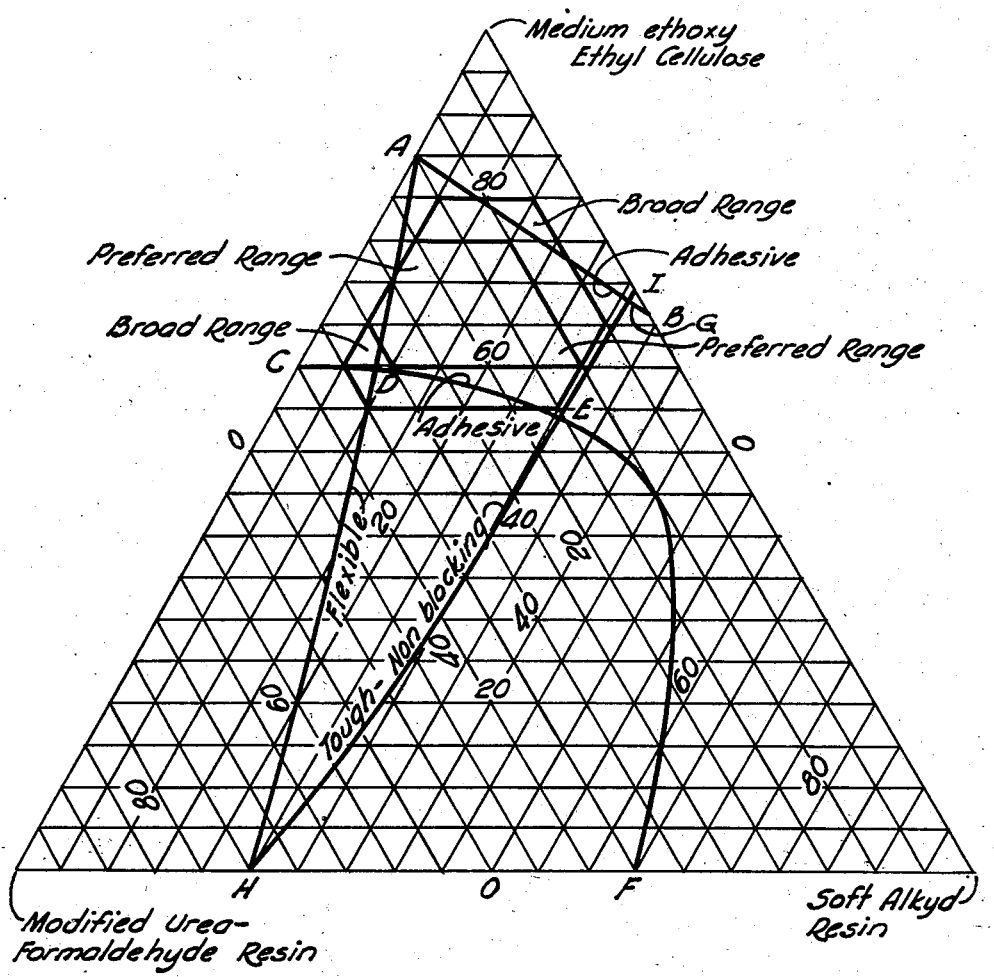

2,243,185

UNITED STATES PATENT OFFICE 2,243,185

COATING FOR RUBBER

Kenneth D. Bacon and Toivo A. Kauppi, Midland, Mich., assignors to The Dow Chemical Company, Midland, Mich., a corporation of Michigan Application January 31, 1940, Serial No. 316,606

4 Claims. (Cl. 260—15)

This invention relates to an improved lacquer coating for rubber and for rubber surfaced articles. It relates particularly to a glossy coating which adheres firmly to rubber and which is tough, flexible, and solvent resistant.

Numerous types of coatings for rubber have been proposed heretofore. Such coatings have been developed for a variety of purposes, which have included (1) protection of the rubber surface against the aging effects of the atmosphere, (2) the improvement of surface slip characteristics, and (3) general ornamentation of the rubber article. Among the known coatings for rubber are several cellulose derivative compositions including unmodified cellulose derivative lacquers, as well as some which contain modifying agents such as plasticizers, resins, or both.

Surface coatings for application to rubber must meet several stringent requirements before they can be considered satisfactory. The coatings must be sufficiently flexible to conform to the highly flexible rubber base when the latter is stretched or bent, without cracking and without loss of adhesion. The coatings must also have glossy, abrasion-resistant and hard surfaces. It has been found that unplasticized cellulose derivative compositions are insufficiently flexible to be satisfactory as rubber coatings. When the rubber base is stretched, such coatings crack and separate from the support. When sufficient plasticizer is added to a cellulose derivative coating composition to obtain satisfactory adhesion and flexibility, the resulting coatings is unduly soft and lacks the necessary resistance to abrasion.

It is accordingly an object of this invention to provide a coating composition which forms highly flexible yet hard, glossy, and firmly adherent coatings on rubber. Another object is to provide a composition as aforesaid which may be made resistant to or insoluble in most common rubber solvents. A further object is to provide a coating for rubber, which coating is not impaired by flexing or scuffing.

To the accomplishment of the foregoing and related ends, the invention then consists of the features hereinafter fully described and particularly pointed out in the claims. The annexed drawing and the following description set forth in detail various combinations of ingredients embodying the invention. Such disclosed combinations constitute, however, but some of the many ways in which the principles of the invention may be used.

The single figure of the said annexed drawing is a ternary composition chart showing the properties of all the compositions of ingredients employed in the present invention, and defines the working range of these proportions.

The foregoing and related objects may be attained according to the invention by coating rubber surfaces with a cellulose ether lacquer, to be more fully described hereinafter, which contains a particular type of heat hardenable resin, evaporating the solvent from the lacquer and heating the coated article to harden or "convert" the resin, thereby making the coating insoluble in such rubber solvents as gasoline.

Specifically the composition of the present invention contains, for each 100 parts by weight, an amount of each of the following components, adjusted within the range recited to make a total of 100 parts.

Table

| Material | Broad range | Preferred range |
|---|---|---|
| Medium ethoxy ethyl cellulose | 55–80 | 60–75 |
| Alcohol modified urea-formaldehyde resin | 35–5 | 30–10 |
| Soft non-oxidizing alkyd resin | 5–30 | 5–30 |

The cellulose ether employed in the herein claimed compositions is a medium ethoxy type of ethyl cellulose. By the expression "medium ethoxy ethyl cellulose" is meant an ethyl cellulose of ethoxy value between 43.5 and 46.5 per cent. So far as is now known this is the only commercially available cellulose derivative possessing high intrinsic flexibility and having at the same time sufficient hardness for the intended use. Ethyl cellulose of lower ethoxy value than that specified is not commercially available, and is in general insufficiently soluble in organic solvents to be satisfactory for the present purposes. Ethyl cellulose of higher substitution than that specified, while possessing the required flexibility, forms coating compositions which are too soft for the intended use. Cellulose esters such as cellulose acetate are difficult to make flexible and adherent. Nitrocellulose is less stable to heat than ethyl cellulose, and coatings containing it cannot readily be applied to rubber which is to be vulcanized after being coated.

Within the scope of the term "medium ethoxy ethyl cellulose," there is included products of widely varying intrinsic viscosities. The viscosities of medium ethoxy ethyl cellulose are, for purposes of comparison, uniformly determined on 5 per cent by weight solutions of the ethyl cellulose in a solvent consisting of 60 parts toluene and 40 parts of ethanol by volume. The flexibility of films formed from ethyl cellulose will vary to some extent with changes in the viscosity type employed. Thus a film of low viscosity type ethyl cellulose is somewhat less flexible than one of high viscosity ethyl cellulose. On the other hand, when formulating coating compositions of the lacquer type, such as those of the present invention, it is usually necessary to utilize a low or moderately low viscosity type of ethyl cellulose in order to obtain coating compositions of high solids content, which compositions themselves have a suitable viscosity to be applied by the usual methods of lacquering. Such methods include brushing, spraying, roller coating and the like. In the present compositions an ethyl cellulose of the medium ethoxy type is satisfactory which has a viscosity, determined as outlined above, between 5 and about 100 centipoises. For most applications, it is preferred that the rubber coating compositions of the present invention contain an ethyl cellulose of viscosity between 20 and 50 centipoises, as these compositions may be dissolved in volatile solvents to form solutions of relatively high solids content which are capable of application by brushing or spraying methods to produce films of sufficient hardness and flexibility for the contemplated use. Where, however, the rubber base to be coated is one not subject to constant flexing and stretching in use and where it is desired to apply a coating composition of very high solids content, the lower viscosity types of medium ethoxy ethyl cellulose may be employed, i. e. those of viscosity type from 5 to 20 centipoises. Again, where a very high degree of flexibility is desired, ethyl cellulose of higher viscosity may be employed. It is understood, of course, that even the viscosity type is from 50 to 100 centipoises or higher a compromise must be made in the matter of total solids content in the coating composition in order to take advantage of the improved flexibility.

The urea-formaldehyde resin employed in the present compositions is one designated as an "alcohol modified urea-formaldehyde resin." Such products are of relatively modern manufacture and are not to be confused with the urea-formaldehyde condensation products available on the market as much as 4 or 5 years ago. The products contemplated by the expression employed are prepared by the condensation of urea and formaldehyde in the presence of an alcohol or similar hydroxy compound in such a manner that the alcohol enters into the resin as a modifying agent therefor, reacting to form what has been designated as an etherified urea-formaldehyde product which is soluble in a solvent mixture containing an alcohol and for each part of alcohol at least two parts by weight of an aliphatic hydrocarbon. In modern practice the hydroxy compounds used to modify urea-formaldehyde resins and to produce the products employed in the present compositions include monohydric alcohols having from 3 to 8 carbon atoms, and certain alkyd resins produced by the condensation of a polyhydric alcohol with less than an equivalent amount of a polybasic acid. The monohydric alcohols most commonly employed are normal butyl alcohol and octyl alcohol. The alcohol modified urea-formaldehyde condensation products are not only characterized by ease of solubility in alcohol-hydrocarbon solvents but also have good compatibility with ethyl cellulose. Numerous modified urea-formaldehyde resins having the required characteristics, all of which are heat hardenable and may be defined as alcohol modified urea-formaldehyde condensation products, are available commercially. The following table lists several such products which have been tested and found satisfactory. The table is not to be construed as limiting, however, but is given purely by way of example.

Table

| Name | Type of resin | Manufacturer |
| --- | --- | --- |
| Beckamine P138 | Monohydric alcohol modified. | Reichhold Chemicals, Inc. |
| Beckamine 3440 | do | Do. |
| Uformite 225 | do | Resinous Products Co. |
| Uformite 226 | do | Do. |
| Uformite 301 | Alkyd modified | Do. |
| Beetle 202-11 | Monohydric alcohol modified. | American Cyanamide & Chemical Corporation. |
| Beetle 227-8 | do | Do. |
| Beetle 592-8 | do | Do. |

Each of the resins enumerated in the foregoing table is sold in the form of a concentrated solution in an alcohol-containing solvent such as butanol, octyl alcohol, or 50-50 mixtures of butanol and toluene. These alcohol solutions all tolerate the addition of up to two parts of aliphatic hydrocarbon diluent for each part of alcohol present, without precipitation of the resin.

The third essential component of the herein claimed compositions is a soft alkyl resin. It is particularly such a resin which is compatible with the cellulose ether and urea-formaldehyde resin. The alkyd resin serves not only as an additional resinous constituent of the composition but also as a plasticizer. This will be discussed more fully hereinafter. Purely by way of illustration of the soft alkyd resins which may be employed, the following commercial products are enumerated:

Table

| Name | Type | Made by |
| --- | --- | --- |
| Paraplex RG-2 | Glyceryl sebacate | Resinous Products Co. |
| Paraplex RG | do | Do. |
| Paraplex G-20 | do | Do. |
| Rezyl X-315 | Fatty acid modified alkyd. | American Cyanamide & Chemical Corporation. |
| Beckasol 1224 | Pure alkyd | Reichhold Chemicals, Inc. |

It has been found that each of the soft alkyd resins commercially available, typified by those enumerated in the foregoing table, when blended with ethyl cellulose alone in the proportion 20 parts alkyd resin and 80 parts of ethyl cellulose and cast from solution to form a film, the said film is softer than a film of the same ethyl cellulose in an unmodified form. In other words, the alkyd resins defined above behave as softening plasticizers for ethyl cellulose. It must be noted, however, that their softening effect is considerably less than that of such common plasticizers as tricresyl phosphate, dibutyl phthalate, and the like.

For use in accordance with the present invention, the composition of ethyl cellulose, urea-formaldehyde resin, and soft alkyd resin, in the proportions before given, is prepared by dissolving these ingredients in a suitable common solvent. When weighing the urea-formaldehyde resin for use in the composition, allowance is made for the fact that it is contained in a solvent. This solvent need not be removed from the urea-formaldehyde resin before making the coating composition as it may form a part of the final rubber lacquer. A wide variety of common solvents for the ingredients of the composition is available. Examples of such solvents, given purely by way of illustration, include the well-known mixture of 80 parts toluene and 20 parts of ethanol. The lacquers may be made of suitable concentration to be applied by means of a doctor blade or by brushing or spraying. The lacquers may be applied either to vulcanized or unvulcanized rubber articles. Where possible, it is particularly advantageous to coat the articles while the rubber is in the unvulcanized state, since after deposition of the lacquer coating, it is necessary that it be baked to effect a hardening of the composition, whereby many of the desirable properties latent in the composition are developed to the fullest possible extent. During such a baking or heat treating operation, the unvulcanized rubber may be vulcanized simultaneously with the hardening of the coating composition. The time of baking to effect the required hardening and to render the composition resistant to the action of rubber solvents will depend to a large extent on the temperature employed. No definite baking schedule can be set down as for any given temperature, the time required will also vary with the particular resinous components of the composition.

The effect of altering the proportions of the three essential ingredients of the rubber lacquer upon the properties of the baked coating is illustrated in the accompanying drawing. This drawing is a ternary composition chart showing all possible permutations of the composition: medium ethoxy ethyl cellulose, alcohol modified urea-formaldehyde resin, and soft alkyd resin. On the ternary composition chart appear isograms representing the properties: flexibility, toughness, and adherence. The lines AB and CDEF are the adherence isograms and the area between these lines defines the compositions having good adherence properties. The area to the right of the line AH defines the flexible compositions and that to the left of the line HI is the region of greatest toughness and resistance to blocking. It is apparent that each of the required characteristics is present to a satisfactory extent only in the area bounded by the points ADEG. This area ADEG corresponds approximately to the broad range of proportions recited above for the new compositions, namely:

Medium ethoxy ethyl cellulose _____ 55–80
Alcohol modified urea-formaldehyde resin_ 35–5
Soft alkyd resin _____ 5–30 where the amount of each component is selected within the stated range so that the total of the three components is 100 parts. On the drawing is shown an area corresponding approximately to area ADEG, and corresponding exactly to the above-stated broad range of proportions of the three ingredients of the coating composition. This area is marked "Broad range." Within the said "Broad range," there is shown on the drawing an area falling entirely within the limits ADEG, and corresponding exactly to the previously stated preferred range of the three ingredients of the coating composition. This area is marked "Preferred range," and defines all compositions within the following limits:

Medium ethoxy ethyl cellulose _____ 60–75
Alcohol modified urea-formaldehyde resin_ 30–10
Soft alkyd resin _____ 5–30 where, as before, the amount of each component is selected within the stated range so that the total of the three components is 100 parts.

The following examples illustrate the practice of the invention.

*Example 1*

The following composition was dissolved to form a 30 per cent solution in a solvent composed of 80 parts of toluene and 20 parts of ethanol:

Parts by weight
Ethyl cellulose (46 per cent ethoxy, 35 centipoises) _____ 60
Beckamine P-138 _____ 20
Paraplex RG-2 _____ 20

The so-formed lacquer was applied by means of a doctor blade to a sample of unvulcanized rubberized fabric. The coating was air dried and the coated article then heated for 30 minutes at 120° C. The heating served both to vulcanize the rubber and to harden and insolubilize the composition. The so-hardened coating was entirely resistant to gasoline and was flexible, glossy, tough, and firmly adherent to the rubberized base.

*Example 2*

The following table lists a number of compositions comprising ethyl cellulose of various degrees of substitution, soft alkyd resins, and alcohol modified urea-formaldehyde resins. The characteristics of the composition after application to rubber surfaces in the manner described in Example 1 are set forth in the table. Compositions numbered from 1 to 4, inclusive, and from 8 to 10, inclusive, are all unsatisfactory for one or more reasons. Compositions numbered from 1 to 4 are seen to fall outside of the claimed range of compositions and to be defective in at least one of the properties reported in the table. Composition number 8 contains no plasticizing resin and is insufficiently flexible. Numbers 9 and 10 contain no urea-formaldehyde resins and have poor adhesion to rubber and are insufficiently tough. Compositions 5, 6 and 7 lie within the preferred range of proportions as hereinbefore set forth and provide excellent coatings in all respects. It might be noted that a composition identical with that of number 5, except that the ethyl cellulose employed was of high ethoxy content (about 49 per cent) has been prepared and employed in tests similar to those herein reported. This composition of high ethoxy ethyl cellulose had only fair adhesion to rubber and was considerably inferior to composition number as to such properties as flexibility, toughness and gloss.

Table

| No. | Composition ||||| Nature of coating |||||
|---|---|---|---|---|---|---|---|---|---|---|
| | Ethyl cellulose || Urea-formaldehyde resin || Plasticizing resin || Adhesion | Flexibility | Toughness | Gloss | Resistance to gasoline |
| | Amt. | Ethoxy | Name | Amt. | Name | Amt. | | | | | |
| | | Percent | | | | | | | | | |
| 1 | 40 | 49 | Uformite 224 | 50 | Paraplex RG-2 | 10 | Excellent | Fair | Poor | Good | Good. |
| 2 | 50 | 49 | ...do... | 40 | ...do... | 10 | Poor | Good | Fair | ...do... | Do. |
| 3 | 40 | 49 | ...do... | 60 | | | Fair | Fair | Good | Fair | Do. |
| 4 | 100 | 46 | | | | | Poor | ...do... | ...do... | Excellent | Fair. |
| 5 | 70 | 46 | Beckamine P138 | 20 | Paraplex RG-2 | 10 | Excellent | Excellent | Excellent | ...do... | Excellent. |
| 6 | 60 | 46 | ...do... | 20 | ...do... | 20 | ...do... | ...do... | ...do... | ...do... | Do. |
| 7 | 70 | 46 | ...do... | 10 | ...do... | 20 | ...do... | ...do... | ...do... | Fair | Good. |
| 8 | 70 | 46 | ...do... | 30 | | | Excellent | Poor | Good | Good | Excellent. |
| 9 | 40 | 49 | | | Paraplex RG-2 / Paraplex RG-7 | 50 / 10 | Poor | Good | Poor | ...do... | Poor. |
| 10 | 50 | 49 | | | Paraplex RG-2 / Paraplex RG-7 | 40 / 10 | ...do... | ...do... | ...do... | ...do... | Do. |

The composition of the present invention is, as has been indicated before, primarily suitable for the coating of rubber surfaces. Compositions outside of the claimed range cannot be employed satisfactorily for this purpose because they fail in one or more of the major requirements. It must be borne in mind, however, that the compositions of the present invention have applicability outside of the particular field for which they were developed. To illustrate, the lacquer compositions of the invention may be employed to coat flexible metal articles or they may be employed wherever lacquers or coating compositions may be used where it is feasible to subject the lacquered article to a baking operation to harden the coating. Thus, while it is impossible to employ any random composition of ethyl cellulose and a urea-formaldehyde resin to produce a satisfactory rubber coating, it does not follow that a composition which is satisfactory for this specific purpose must be limited to this use.

The invention has been illustrated with respect to medium ethoxy ethyl cellulose, i. e. one having an ethoxy value of from 43.5 to 46.5 per cent. It is to be understood that other lower alkyl ethers of cellulose of the organo-soluble type may be employed instead of the particular cellulose ether specified, provided that these ethers contain just enough alkyl groups to make them organo-soluble, but do not contain enough etherifying substituents to make them unduly soft. These other materials, however, are not at present commercially available and laboratory specimens do not have the uniformity which is now obtainable in the commercially produced medium ethoxy ethyl cellulose.

We claim:
1. A coating composition, particularly adapted for the coating of rubber surfaces, consisting essentially of the following enumerated solids: from about 55 to about 80 per cent by weight of medium ethoxy ethyl cellulose, from 5 to about 35 per cent by weight of an alcohol-soluble, alcohol-modified, heat-convertible urea-formaldehyde condensation product and from 5 to about 30 per cent of a soft alkyd resin compatible therewith.

2. A coating composition, particularly adapted for the coating of rubber surfaces, consisting essentially of the following enumerated solids: from about 60 to about 75 per cent by weight of medium ethoxy ethyl cellulose, from about 10 to about 30 per cent of an alcohol-soluble, alcohol-modified, heat-convertible urea-formaldehyde condensation product, and from 5 to about 30 per cent of a soft alkyd resin compatible therewith.

3. A coating composition, particularly adapted for the coating of rubber surfaces, consisting essentially of the following enumerated solids: about 60 per cent of medium ethoxy ethyl cellulose, about 20 per cent of an alcohol-soluble, alcohol-modified, heat-convertible urea-formaldehyde condensation product, and about 20 per cent of a glyceryl sebacate alkyd resin.

4. A coating composition, particularly adapted for the coating of rubber surfaces, consisting essentially of the following enumerated solids: about 70 per cent of medium ethoxy ethyl cellulose, about 20 per cent of an alcohol-soluble, alcohol-modified, heat-convertible urea-formaldehyde condensation product, and about 10 per cent of a glyceryl sebacate alkyd resin.

KENNETH D. BACON.
TOIVO A. KAUPPI.